United States Patent [19]
Grieb et al.

[11] Patent Number: 5,396,606
[45] Date of Patent: Mar. 7, 1995

[54] ADDRESS BUS SWITCHING BETWEEN SEQUENTIAL AND NON-SEQUENTIAL ROM SEARCHES

[75] Inventors: Robert L. Grieb, Medford; Mark Todorovich, Medford Lakes, both of N.J.

[73] Assignee: Franklin Electronic Publishers, Incorporated, Mt. Holly, N.J.

[21] Appl. No.: 739,132

[22] Filed: Jul. 31, 1991

[51] Int. Cl.$^6$ .................... G06F 12/00; G06F 13/16
[52] U.S. Cl. .................................................. 395/400
[58] Field of Search .................... 395/400, 425; 364/DIG. 1, DIG. 2, 238, 942.03, 942.06, 942.1, 959; 341/22

[56] References Cited

U.S. PATENT DOCUMENTS

| | | | |
|---|---|---|---|
| 3,906,457 | 9/1975 | Mahedi et al. | 395/144 |
| 4,383,296 | 5/1983 | Sander | 395/425 |
| 4,464,731 | 8/1984 | Nishimura | 364/419 |
| 4,499,554 | 2/1985 | Kobayashi | 364/419 |
| 4,500,956 | 2/1985 | Leininger | 395/425 |
| 4,542,478 | 9/1985 | Hashimoto et al. | 364/419 |
| 4,543,629 | 9/1985 | Carey et al. | 395/325 |
| 4,628,482 | 12/1986 | Tachiuchi et al. | 395/425 |
| 4,803,618 | 2/1989 | Ita et al. | 395/425 |
| 4,862,166 | 8/1989 | Yamakawa | 341/22 |

Primary Examiner—Jack B. Harvey
Assistant Examiner—Jack A. Lane
Attorney, Agent, or Firm—McAulay Fisher Nissen Goldberg & Kiel

[57] ABSTRACT

A hand held electronic data processing device has an input keyboard and a display screen. A sixteen bit central processing unit (CPU) address bus addresses read only memory (ROM) and random access memory (RAM). However, a twenty bit register provides a twenty line address bus that is employed for addressing sequential data in ROM. A direct memory access (DMA) unit provides direct transfer of data from RAM to a forty bit register which controls the state of the pixels in a 240 character liquid crystal display (LCD). The keyboard is connected in an electronic matrix with rows driven by signals applied by system address bus lines. These various functions require exclusive use of the system address bus. Accordingly an address selector is employed to determine which of the functions is to capture the system address bus; the functions being (a) CPU address of ROM and RAM, (b) Register sequential address of ROM, (c) DMA address of RAM for delivery to LCD display, and (d) the driving of the rows of the keyboard matrix.

12 Claims, 4 Drawing Sheets

ADDRESS BUS SWITCHING BETWEEN SEQUENTIAL AND NON-SEQUENTIAL ROM SEARCHES

BACKGROUND OF THE INVENTION

This invention relates in general to techniques for efficiently employing the hardware and software in a data processing system. More particularly, this invention is directed to time division multiplexing techniques for employing the address bus.

Data processing systems are known, often of a self-contained hand held variety, in which a central processing unit (CPU) responds to keyboard inputs and reads from a read only memory (ROM) to provide appropriate data and information to a random access memory (RAM) unit thereby temporarily storing information to be displayed on a display screen associated with the keyboard.

It is known in such arrangements to provide certain processes for speeding up the response time between a keyboard input and the display of appropriate information on the screen. One technique that is employed is to provide direct memory access (DMA) hardware designed to transfer information from the RAM unit to the screen without requiring use of the CPU for that function.

It should be understood that techniques of speeding up processing are part of a trade-off between CPU capacity, hardware costs and response time. In order to provide compact, relatively inexpensive data processing units and in particular those that are self-contained, battery operated, hand-held units, it is important that the most efficient use of hardware and software be employed so that cost and size can be minimized while response time can be maintained at a level acceptable to the user.

Accordingly, the major purpose of this invention is to provide various techniques for more efficiently using the equipment in a data processing system having a keyboard and a display screen.

SUMMARY OF THE INVENTION

In brief, one embodiment of this invention applies to hand held spelling correctors, dictionaries and the like having a keyboard input and an LCD display screen. Multiplexing of the use of the system address bus provides an efficient use of chip capacity and terminals. The system address bus is primarily employed to provide interfacing between the CPU and the read only memory (ROM) as well as between the CPU and the read/write memory (RAM).

However, there are short periods of time when the system address bus is employed as part of the input lines to a keyboard matrix so that the keyboard can be read. For example, for an eight microsecond time period, the CPU clock stops so that the rows of the keyboard can be appropriately driven and the keyboard read. This occurs once every eight milliseconds so that the system address bus is employed for this keyboard energizing and reading purposes for only 0.1 percent of the time.

The information which is in ROM that is selected by the CPU for display is, under control of the CPU, put into an appropriate RAM unit.

In one embodiment an LCD display has sixteen characters with 640 pixels. In order to reduce the number of registers, a five register (40 bit) unit is employed to provide input to the display forty pixels at a time. The use of a direct memory access (DMA) arrangement to address the RAM enables faster transfer of information to the five register unit and thus to the display than if the CPU were used for that transfer. The DMA address bus is connected to the system address bus and the CPU address bus disconnected for the short periods of time it takes to effect this transfer from RAM. This takes a time period that constitutes approximately 0.5 percent of the operating time period.

A 20 bit register/counter is employed to provide a 20 line address bus for addressing sequential data in the ROM. Accordingly, this register is called herein a ROM register. This permits faster ROM scanning than can be had with the 16 line address bus of the CPU. The 16 line address bus is used for non-sequential ROM scan routines.

An address selector is employed to control access to the system address bus by (a) the CPU address bus, (b) the DMA address unit, (c) the line register address bus from the ROM register and (d) the keyboard row drive signals.

The consequence of these arrangements is to provide efficient use of a reasonable size CPU with reasonably prompt display of data in response to keyboard input.

DESCRIPTION OF THE PREFERRED EMBODIMENTS

Figure 1:
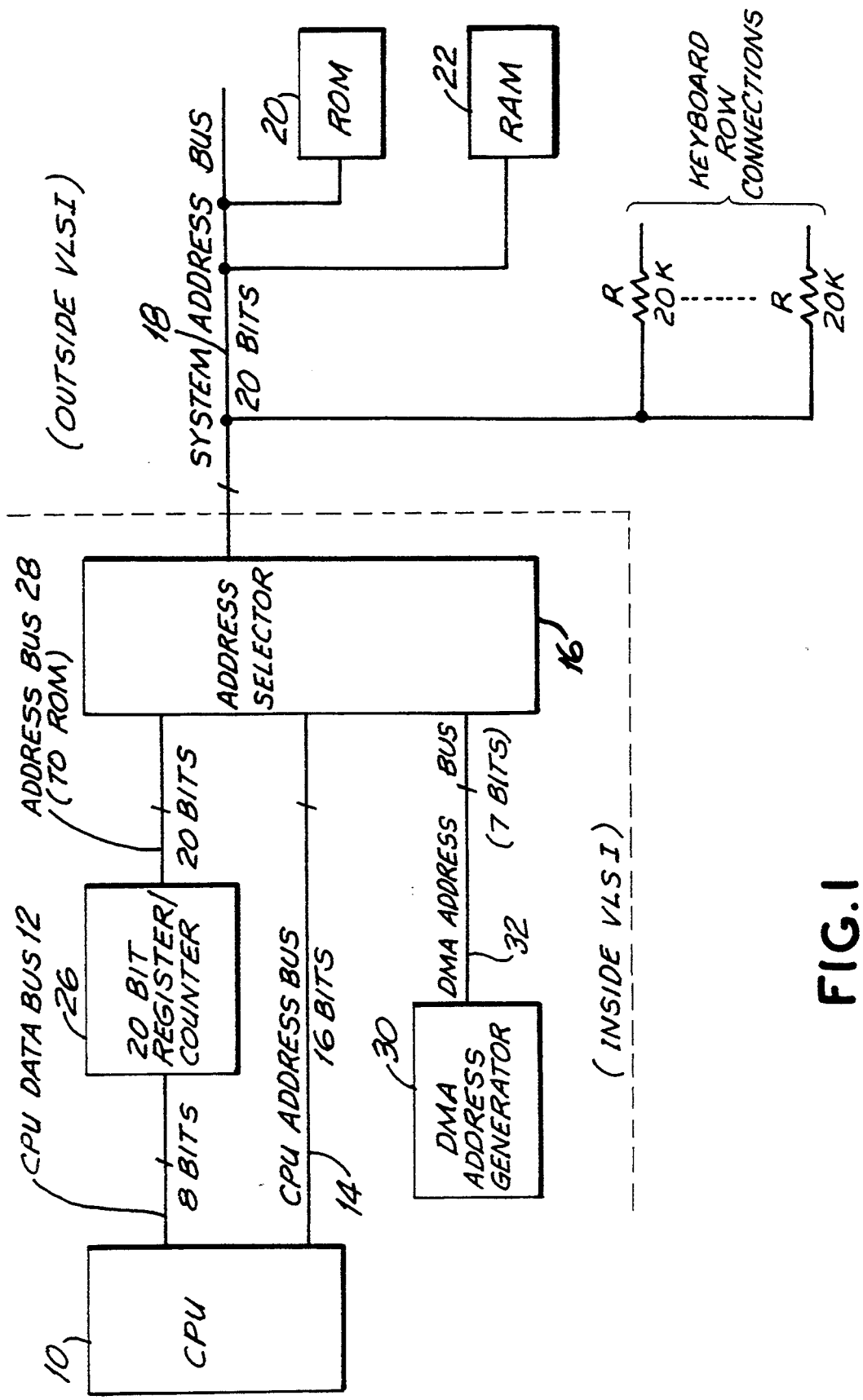
FIG. 1 is a block diagram of the address line arrangement of an embodiment of this invention showing an address selector 16 for selecting on a time exclusive basis one of various input address bus arrangements as the system address bus 18.
Figure 2:
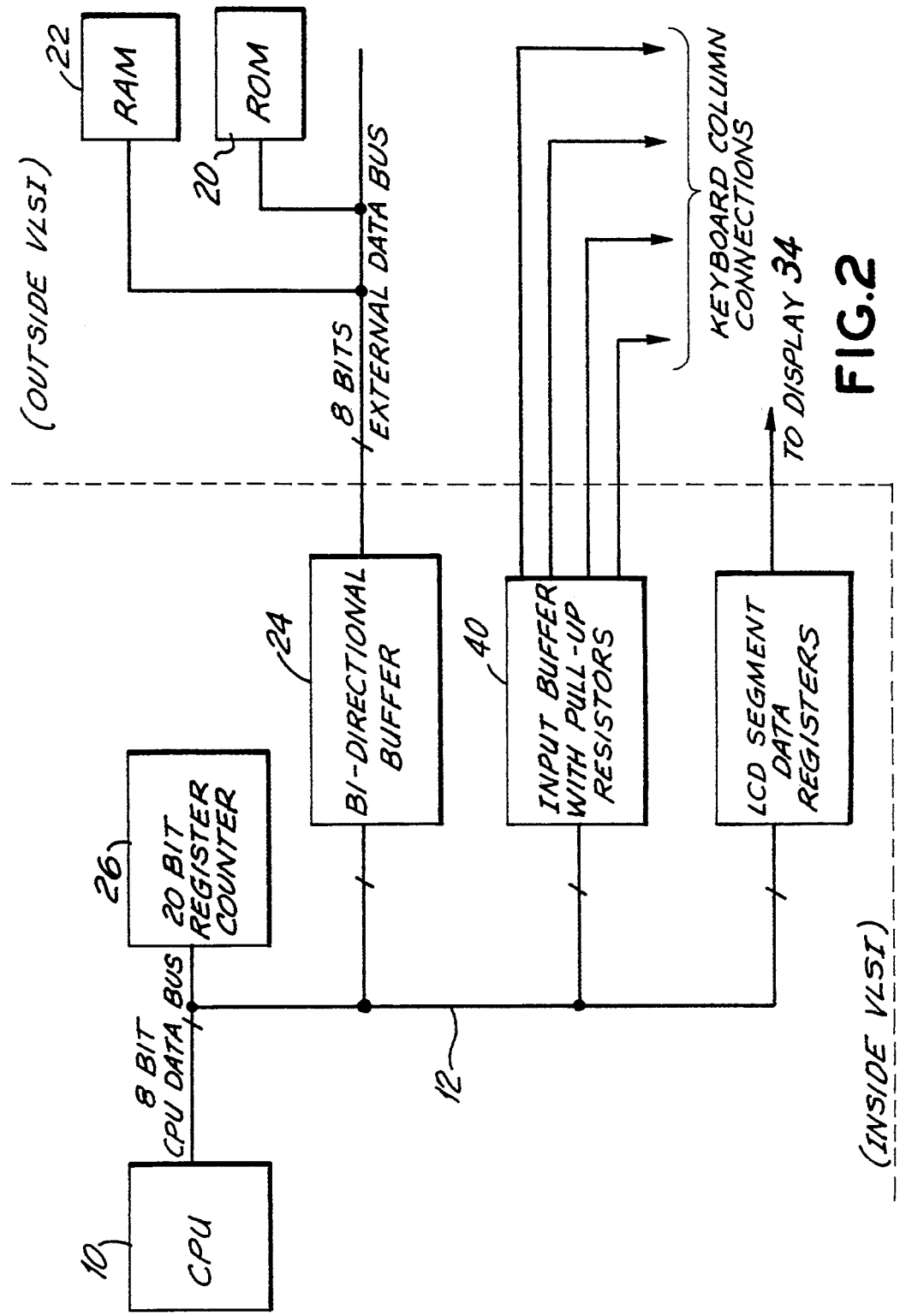
FIG. 2 is a block diagram of the system of this invention illustrating certain data flow interconnections which are enabled by the system address bus state determined by the address selector 16.
Figure 3:
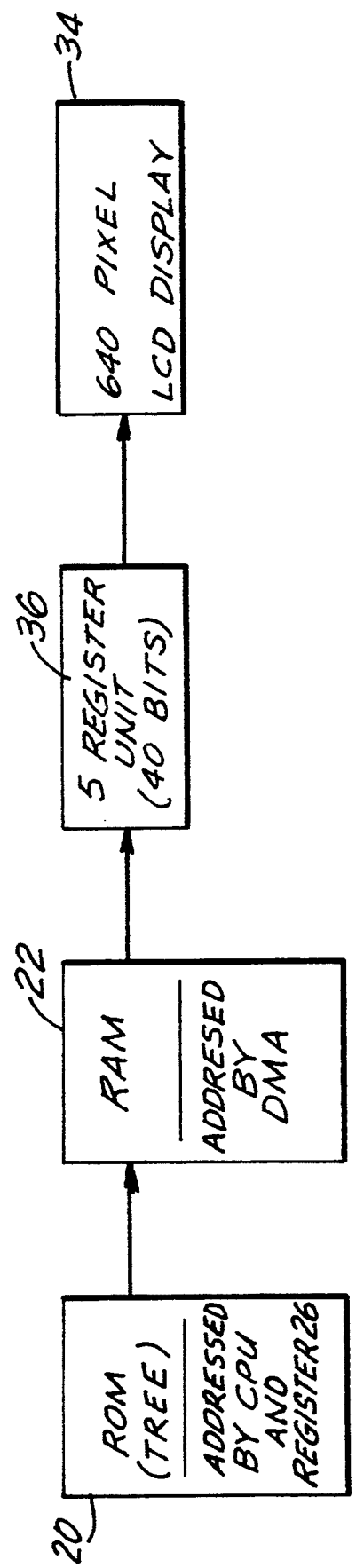
FIG. 3 is a block diagram illustrating data flow from ROM and RAM to display; the data flow from ROM to RAM being under control of the CPU 10 while the data flow from RAM to display is under control of a direct memory access (DMA) unit 30.
Figure 4:
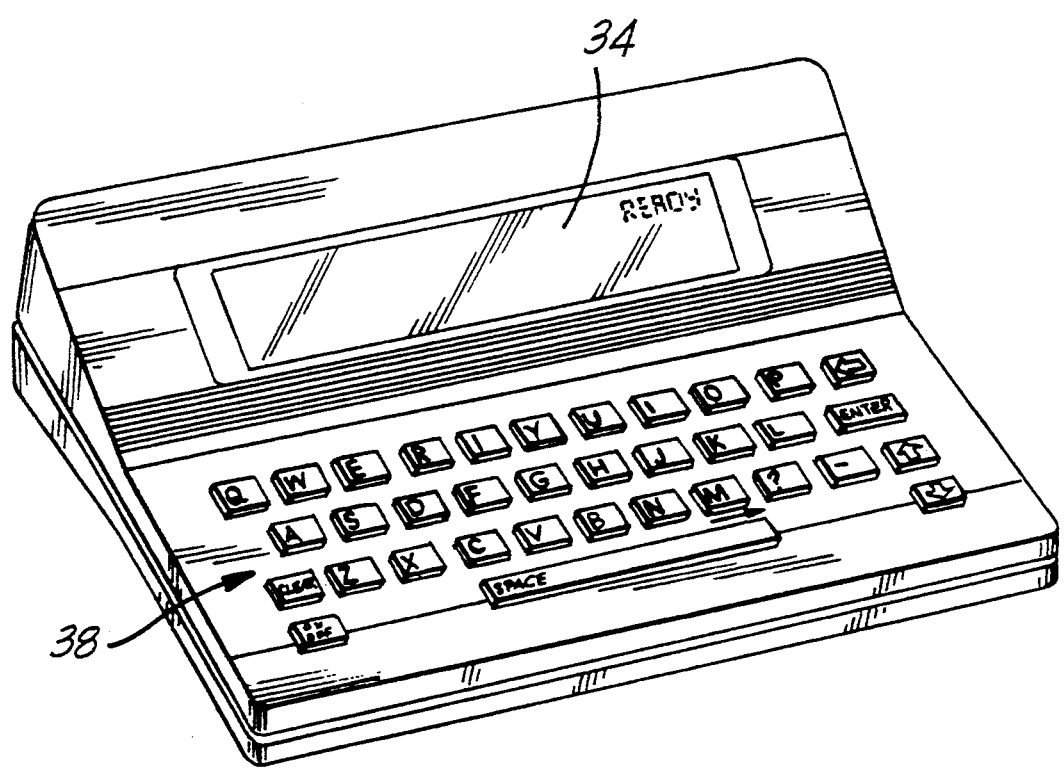
FIG. 4 is a perspective view of a hand held device having a keyboard 38 and display screen 34 that embodies this invention.

The figures all relate to the same embodiment. However, FIG. 1 is directed to show the essential address relationships of this invention while FIGS. 2 and 3 show certain data flow relationships of this invention.

A central processing unit 10 (CPU) has a sixteen bit address bus 14 which is normally connected through the address selector 16 as the system address bus 18. In that address state, the CPU 10 addresses either the main memory 20 (ROM) or the read write memory 22 (RAM). When so connected, that is when the CPU address bus 14 is connected as the system address bus 18, data from either ROM 20 or RAM 22 is read through the bi-directional buffer 24 (see FIG. 2) by the CPU 10. This relationship of the CPU 10, ROM 20 and RAM 22 is a usual relationship and nothing more about the architecture of such need be explained here since such is known in the art.

The embodiment of this invention disclosed herein is a hand held, battery operated data processing device such as a spelling corrector or dictionary which has a keyboard 38 through which the user can input words, commands and punctuation. Associated with the keyboard is a 640 pixel LCD display 34. In an embodiment that has a spelling correction function, a user inputs a word through the keyboard 38. After pressing the Enter key, the system, under control of the CPU 10 provides a search through a read only memory 20 (ROM) that provides validation of the spelling of the input word and/or a set of suggested words that may constitute the correct spelling of the intended input word. These suggested words are validated words and are then provided to the user at the display 34. The spelling correction function is known in the art. One example of such is described in U.S. Pat. No. 4,830,618 issued on May 16, 1989. Another type of function with which this invention can be employed is in an electronic dictionary and thesaurus function described, for example, in U.S. Pat. No. 5,007,019 issued on Apr. 9, 1991.

ROM Address Expansion

One of the applications of this invention is to a spelling corrector device. In one such device, English language words are encoded in ROM 20 in a known tree format. Scanning through appropriate portions of that tree often calls for a sequential scan. In order to provide for such a sequential scan in a more efficient fashion and in particular to speed up the scanning operation, a twenty bit register/counter 26 is employed to provide what is in effect a twenty bit address bus 28 rather than the sixteen bit CPU address bus 14. In particular, when sequential addresses in ROM 20 are to be scanned by the CPU 10, the register 26 output is connected as an address bus 28 through the address selector 16 to operate as the system address bus 18. In that address state, sequential ROM 20 addresses are scanned by the CPU 10 by what is in effect a twenty bit ROM address bus. When non-sequential portions of ROM 20 have to be scanned, the CPU 10 causes the address selector 16 to switch back to selection of the CPU address bus 14 as the system address bus 18.

The CPU data bus 12 initializes the ROM register 26 at each stage of sequential reading.

Direct Memory Access (DMA)

Data from ROM 20 is normally selected by a program which responds to a particular keyboard 38 input so as to provide a particular display for the user on an LCD display 34. Data selected from ROM for such a display is normally temporarily stored in RAM 22.

As indicated in FIG. 3, when the display is to be generated or corrected, data is transferred from RAM 22 to the LCD display 34 through a five register unit 36, which unit 36 has forty bits. In order to effect the transfer from RAM more quickly and avoid the burden on the CPU 10, a direct memory access 30 (DMA) is employed. The DMA 30 has a DMA address bus 32 which at appropriate times is connected through the address selector 16 as the system address bus 18. When so connected, the DMA 30 causes the RAM 22 data to be read into the five register unit 36 from which the LCD display 34 is updated or refreshed forty pixels at a time.

At this point, it may be noted that the address selector 16 serves to selectively connect the CPU address bus 14, the twenty bit ROM address bus 28 and the DMA address bus 32 to the system address bus 18. Of course, only one of these address buses, 14, 28 or 32 can be connected to the system address bus 18 at a time. The ROM register address bus 28 and the CPU address bus 14 operate in cooperation to address the ROM and thus appropriately alternate with one another.

However, the use of the DMA 30 requires that the CPU time clock be stretched out during the DMA operation. Because the DMA is a hard wired arrangement specifically for the purpose of reading from RAM 22 at appropriate times, this reading operation occurs very quickly and the amount of time required for the DMA operation is very small, well under one percent of CPU operating time.

Keyboard Reading

The keyboard 38 is arranged in a known matrix fashion which involves setting up the keys in electronic rows and columns. These electronic rows and columns have no necessary orthographic relationship to the keyboard. Thus the number of electronic rows and the number of electronic columns can be the same as one another. When a key is depressed, the juncture of the row and column representing that key is shorted. If the row is driven low, the column will then go low and detection of the state of the column will identify the key depressed.

The keyboard reading mode employs a two stage process. In the first stage, a check on whether or not any of the keys are down is made. This check is made once each eight milliseconds. What happens is that a particular instruction codes to the CPU 10 causes the address selector 16 output to go low on all system address bus 18 lines so that each keyboard row is low. If any one of the keys are depressed, then one of the columns will go low and will be detected through the buffer 40. The fact of a low column is thereby detected and indicates that one of the keys is actuated.

During this any key down check, a short period of time is required to bring down the voltage on each row resistor. An eight micro-second wait is required. Accordingly the keyboard control circuit causes the CPU clock cycle to extend for eight micro-seconds to let the keyboard row inputs stabilize. At the end of the eight micro-seconds, the column read is taken to determine if any key is down.

If, and only if, one of the keys is down, then a specific key reading routine has to be undertaken. That routine is undertaken by use of the ROM read register 26. The data in the register 26 is stored and saved in RAM to be later returned to the register 26 so that the appropriate ROM reading can continue. The register 26 output address lines 28 are connected by the selector 16 to the system address bus 18 to drive the rows of the keyboard. During this specific key reading routine, the lines are energized with a set of patterns, one line low and the rest high to drive one row at a time low until a column reading shows that a row which is being driven low results in a particular column going low. The low column is read by the CPU data bus 12 and identifies the key being actuated. For each row being driven low, the eight micro-second clock extension is required because of the need to stabilize the keyboard signals.

Resistors (20K ohm in this embodiment) in each keyboard row avoids shorting the lines of the address bus 18 to each other if two keys in the same column are pushed down at the same time. Stabilization is required because of the RC circuit time constant that is associated with the keyboard connections that arises from various stray capacitances associated with keyboard connections and lines to the keyboard plus the 20K ohm resistors on each keyboard row.

In a practical embodiment, where a standard 100 pin VLSI chip package is employed, 56 pins may be required for a single line, sixteen character display which together with the other required pins for data and address bus lines would make it impossible to incorporate all of the functions of this device within the limits of the number of pins in the particular package. In order to provide a more economical arrangement than going to a larger package with more pins, the various features of this system are employed. As a consequence, a smaller standard sized chip package can be employed than otherwise would be the case.

It should be noted that the RAM 22 could be either part of or not part of the chip which includes the CPU 10, register 26, DMA 30 and selector 16. In either case, the RAM 22 would be on the output of the address selector 16 so as to provide the more efficient design and arrangement shown herein.

It may be noted, in general terms, that each of the functions using the system address bus 18 may require a different number of bits. For example, in some embodiments the number of keyboard rows may be only eight. The DMA address, in one embodiment is only seven bits. In those circumstances, when the particular input bus or set of lines to the address selector 16 is connected to the system address bus, not all of the system address bus lines will be required for the function involved. As is known in the art, the system address lines which are not required can either be all driven into one logic state or can be allowed to have whatever state the circuitry imposes upon them. Some lines simply have no purpose for the particular function involved.

More particularly, the lines not required for the DMA function are all driven high so that a predetermined appropriate portion of the RAM 22 is addressed by those lines which will function for this DMA purpose. During the any key down check, all of the 20 outputs of the address selector 16 are driven low even though only some of the system address bus lines are connected to the keyboard rows. It is only the latter that can result in producing a low on one of the columns thereby indicating at least one key is low. When the twenty bit register 26 is used to address particular ones of an eight row matrix, then only one byte of the register 26 need be exercised and coupled to the appropriate eight lines on the system address bus which are connected to the eight keyboard rows. A bank register is used to supplement the CPU address bus 14 during ROM scan by the bus 14.

What is claimed is:

1. A data processing system having a central processing unit (CPU) and application program, a keyboard to permit operator input of data, the application program responding to keyboard input by searching a read only memory (ROM) preparatory to display of data from the ROM on a display screen comprising:
    a CPU address bus,
    a system address bus separate from said CPU address bus,
    a register counter initialized by the application program, said register counter having an output that provides an auxiliary address bus,
    an address selector having said CPU address bus and said auxiliary address bus as inputs and said system address bus as an output,
    said address selector having a first state and a second state, the state of said address selector being determined by the address on the CPU address bus, a predetermined address on said CPU address bus causing said address selector to be in said first state,
    said address selector in said first state coupling said auxiliary address bus to said system address bus to provide the CPU with access through said auxiliary address bus to sequential data in ROM, said predetermined address being reiterated for each sequential reading of data in ROM,
    said address selector in said second state coupling said CPU address bus to said system address bus to provide the CPU with direct access to data in ROM.

2. The data processing system of claim 1 including a random access memory (RAM) for temporary storage of data from the ROM further comprising:
    a direct memory access (DMA) unit having a DMA address bus adapted to transfer data from the RAM for display on the display screen,
    said address selector further providing time division multiplexing of access to said system address bus by said DMA address bus during a CPU clock cycle extension of a first predetermined duration.

3. The data processing system of claim 2 wherein:
    the keyboard is connected in an electronic matrix having rows and columns in which said rows are driven during reading of the keyboard input,
    said rows being coupled to said system address bus,
    said address selector placing said system address bus and said rows in a low state during a second CPU clock cycle extension of a second predetermined duration to provide a low column output indicating that a key is depressed,
    said system responding to a low column output to provide a series of patterns on said output of said register counter during a third CPU clock cycle extension of a third predetermined duration, said series of patterns being appropriate to drive one system address bus line and one row low at a time,
    said address selector, during said third CPU clock cycle extension coupling said auxiliary address bus to said system address bus to provide a low column output identifying the key that is pressed when the corresponding row is driven low by the one of said patterns affecting that row.

4. The system of claim 3 wherein:
    said system addresses bus and said auxiliary address have the same number of lines as one another and more lines than does CPU address bus.

5. The system of claim 2 wherein:
    said system address bus and said auxiliary address have the same the same number of lines as one another and more lines than does the CPU address bus.

6. The data processing system of claim 1 wherein:
    the keyboard is connected in an electronic matrix having rows and columns in which said rows are driven during reading of the keyboard input,
    said rows being coupled to said system address bus,
    said address selector placing said system address bus and said rows in a low state during a second CPU clock cycle extension of a second predetermined duration to provide a low column output indicating that a key is depressed,
    said system responding to a low column output to provide a series of patterns on said output of said register counter during a third CPU clock cycle extension of a third predetermined duration, said series of patterns being appropriate to drive one system address bus line and one row low at a time, said address selector, during said third CPU clock cycle extension coupling said auxiliary address bus to said system address bus to provide a low column output identifying the key that is pressed when the corresponding row is driven low by the one of said patterns affecting that row.

7. The system of claim 6 wherein:
said system address bus and said auxiliary address have the same number of lines as one another and more lines than does the CPU address bus.

8. The system of claim 1 wherein:
said system address bus and said auxiliary address have the same number of lines as one another and more lines than does the CPU address bus.

9. In a data processing system having a central processing unit (CPU) and application program with a CPU address bus, a keyboard to permit operator input of data, the application program responding to keyboard input by searching a read only memory (ROM) prepatory to display of ROM data on a display screen, a method of searching ROM comprising the steps of:
providing an auxiliary address bus under control of a register counter,
providing a system address bus for addressing the ROM,
connecting said system address bus to the CPU address bus to provide the CPU with direct access to data in ROM,
initializing said register counter by the program,
switching said system address bus from the CPU address bus to said auxiliary address bus in response to a predetermined address on said CPU address bus to provide the CPU with access to ROM through said auxiliary address bus when a sequential search of data in ROM is to be undertaken,
reiterating said predetermined address on said CPU address bus for each sequential reading of data in ROM, and
returning said system address bus to the CPU address bus when said sequential search of data in ROM has been completed.

10. The method of claim 9 wherein the data processing system includes a random access memory (RAM) for temporary storage of data from the ROM and also includes a direct memory access (DMA) unit having a DMA address bus adapted to transfer data from the RAM for display on the display screen further comprising the step of:
switching said system address bus to said DMA address bus during a first CPU clock cycle extension.

11. The method of claim 10 wherein the keyboard of said data processing system is connected in an electronic matrix having rows and columns in which said rows are driven during reading of the keyboard input, further comprising the step of:
switching said system address bus to a low state during a second CPU clock cycle extension placing all of said rows in a low state to provide a low column output if any one of the keys of the keyboard are depressed,
responding to a low column output by switching said system address bus to said auxiliary address bus during a third CPU clock cycle extension, and during said third CPU clock cycle extension providing a series of register counter output patterns, each of said patterns being appropriate to drive one system address bus line and one keyboard row low at a time,
detecting a low output column, to identify the depressed key as the intersection of the low output column coincident with a low row.

12. The method of claim 9 wherein the keyboard of said data processing system is connected in an electronic matrix having rows and columns in which said rows are driven during reading of the keyboard input, further comprising the step of:
switching said system address bus to a low state during a second CPU clock cycle extension placing all of said rows in a low state to provide a low column output if any one of the keys of the keyboard are depressed,
responding to a low column output by switching said system address bus to said auxiliary address bus during a third CPU clock cycle extension, and during said third CPU clock cycle extension providing a series of register counter output patterns, each of said patterns being appropriate to drive one system address bus line and one keyboard row low at a time,
detecting a low output column, to identify the depressed key as the intersection of the low output column coincident with a low row.

* * * * *